(12) United States Patent
Jin et al.

(10) Patent No.: US 11,496,064 B2
(45) Date of Patent: Nov. 8, 2022

(54) RESONANT CONVERTER AND MANUFACTURING METHOD OF TRANSFORMER THEREOF

(71) Applicant: Delta Electronics, Inc., Taoyuan (TW)

(72) Inventors: Da Jin, Taoyuan (TW); Yahong Xiong, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 75 days.

(21) Appl. No.: 17/244,576

(22) Filed: Apr. 29, 2021

(65) Prior Publication Data

US 2021/0249960 A1 Aug. 12, 2021

Related U.S. Application Data

(63) Continuation of application No. 16/813,374, filed on Mar. 9, 2020, now Pat. No. 11,031,878.

(30) Foreign Application Priority Data

Mar. 19, 2019 (CN) .......................... 201910208305.4

(51) Int. Cl.
*H02M 7/48* (2007.01)
*H02M 3/28* (2006.01)
(Continued)

(52) U.S. Cl.
CPC ..... *H02M 3/3376* (2013.01); *H02M 3/33546* (2013.01); *H02M 1/0058* (2021.05);
(Continued)

(58) Field of Classification Search
CPC .... H02M 3/28; H02M 3/335; H02M 3/33546; H02M 2007/4815; H02M 7/4826
(Continued)

(56) References Cited

U.S. PATENT DOCUMENTS

| 6,147,886 A | 11/2000 | Wittenbreder |
| 7,145,786 B2 | 12/2006 | Vinciarelli |

(Continued)

FOREIGN PATENT DOCUMENTS

| CN | 103684028 A | 3/2014 |
| CN | 105099205 A | 11/2015 |

(Continued)

*Primary Examiner* — Gary A Nash
(74) *Attorney, Agent, or Firm* — Kirton McConkie; Evan R. Witt

(57) ABSTRACT

A resonant converter and a manufacturing method of a transformer thereof are provided. The resonant converter includes a full bridge circuit, an element, a first branch circuit, a second branch circuit and a secondary winding. The full bridge circuit includes a first node and a second node. The element includes an inductor or a capacitor. The first branch circuit includes a first primary winding. The second branch circuit includes a second primary winding, and the first and second primary windings have the same turn number. The transformer is constructed by the first and second primary windings and the secondary winding. The first branch circuit, the element and the second branch circuit are sequentially coupled in series between the first and second nodes. The first branch circuit and the second branch circuit are symmetrically located with respect to the element. The first and second branch circuits have the same impedance.

16 Claims, 16 Drawing Sheets

(51) Int. Cl.
　　　*H02M 3/335*　　　(2006.01)
　　　*H02M 3/337*　　　(2006.01)
　　　*H02M 1/00*　　　(2006.01)

(52) U.S. Cl.
　　　CPC .............. *H02M 3/28* (2013.01); *H02M 3/335* (2013.01); *H02M 7/4815* (2021.05); *H02M 7/4818* (2021.05); *H02M 7/4826* (2013.01)

(58) Field of Classification Search
　　　USPC ........................................... 363/21.01, 21.02
　　　See application file for complete search history.

(56) References Cited

U.S. PATENT DOCUMENTS

| | | | | |
|---|---|---|---|---|
| 9,502,987 | B1* | 11/2016 | Feno | H02M 3/33546 |
| 2008/0150665 | A1* | 6/2008 | Li | H01F 3/10 |
| | | | | 336/177 |
| 2014/0043127 | A1* | 2/2014 | Worek | H01F 27/38 |
| | | | | 336/178 |
| 2017/0019032 | A1* | 1/2017 | Saggini | H02M 3/33546 |
| 2017/0353049 | A1* | 12/2017 | Delanoe | H01F 27/306 |
| 2019/0109542 | A1* | 4/2019 | Yang | H02M 3/33546 |

FOREIGN PATENT DOCUMENTS

| | | |
|---|---|---|
| CN | 107078729 A | 8/2017 |
| CN | 107222096 A | 9/2017 |
| CN | 108206636 A | 6/2018 |
| WO | 2018080913 A1 | 5/2018 |

\* cited by examiner

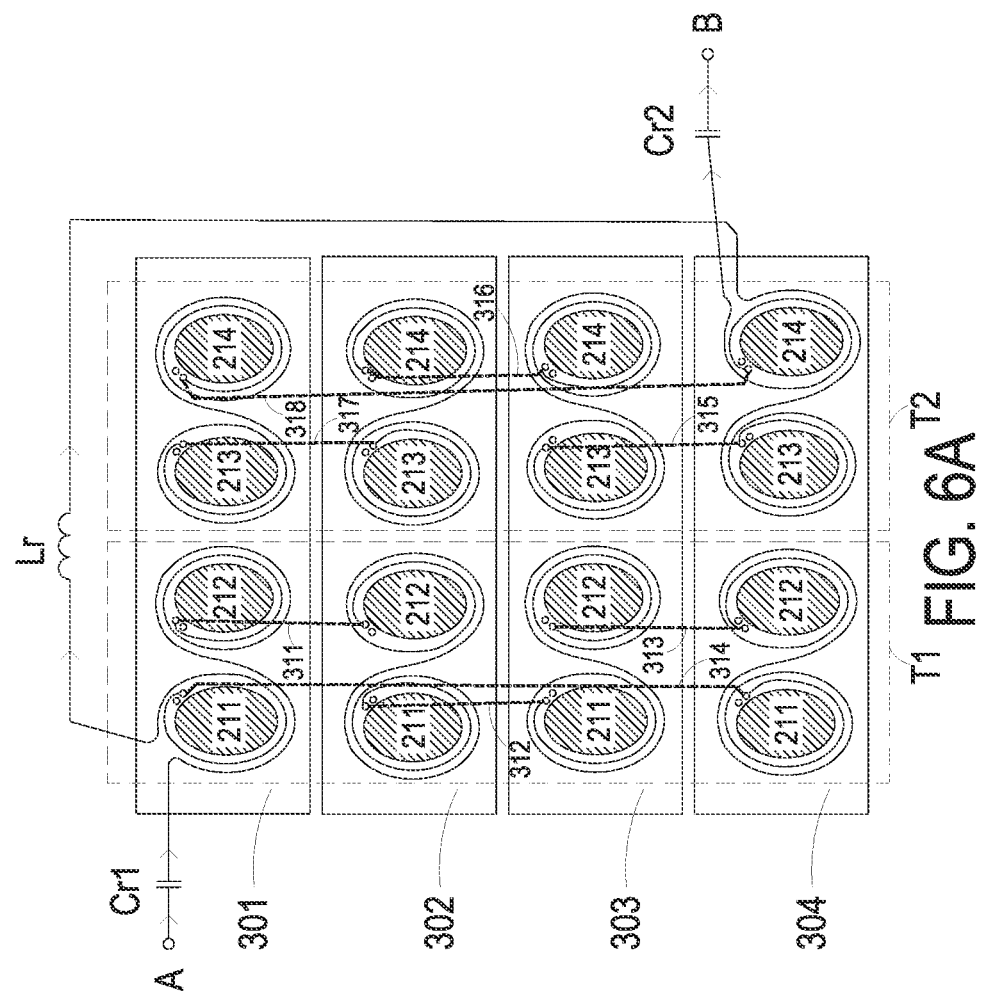

```
┌─────────────────────────────────────────┐
│  A magnetic core assembly is provided,  │
│  and the magnetic core assembly         │─ S1
│  includes a first middle pillar, a      │
│  second middle pillar, a third middle   │
│  pillar, a fourth middle pillar, two    │
│  side pillars and a base plate.         │
└─────────────────────────────────────────┘
                    │
┌─────────────────────────────────────────┐
│ Two primary windings and two secondary  │
│ windings are provided, the two primary  │
│ windings are a first primary            │─ S2
│ winding and a second primary winding    │
│ having the same turn number, and the    │
│ two secondary windings are a first      │
│ secondary winding and a second          │
│ secondary winding having the same       │
│ turn number.                            │
└─────────────────────────────────────────┘
                    │
┌─────────────────────────────────────────┐
│ The first primary winding is wound      │
│ around the first and second middle      │
│ pillars, and the second primary winding │
│ is wound around the third and fourth    │─ S3
│ middle pillars. The directions of two   │
│ lines of magnetic field, which are      │
│ caused by the electricity passing       │
│ through the primary windings wound      │
│ around any two neighboring middle       │
│ pillars respectively, are opposite to   │
│ each other.                             │
└─────────────────────────────────────────┘
                    │
┌─────────────────────────────────────────┐
│ The first secondary winding is wound    │
│ around the first and second middle      │─ S4
│ pillars, and the second secondary       │
│ winding is wound around the third and   │
│ fourth middle pillars.                  │
└─────────────────────────────────────────┘
```

FIG. 11

RESONANT CONVERTER AND MANUFACTURING METHOD OF TRANSFORMER THEREOF

CROSS-REFERENCE TO RELATED APPLICATION

This application is a continuation application of U.S. patent application Ser. No. 16/813,374 filed on Mar. 9, 2020 and entitled "RESONANT CONVERTER AND MANUFACTURING METHOD OF TRANSFORMER THEREOF", which claims priority to China Patent Application No. 201910208305.4, filed on Mar. 19, 2019. The entire contents of the above-mentioned patent applications are incorporated herein by reference for all purposes.

FIELD OF THE INVENTION

The present disclosure relates to a resonant converter, and more particularly to a resonant converter and a manufacturing method of a transformer of the resonant converter.

BACKGROUND OF THE INVENTION

Nowadays, integrated DC-to-DC power module is extensively applied in various fields, such as mobile communication, data center and supercomputer. With the rapid development of landline and mobile communication, the demand on input power, efficiency and size become higher and higher as well. The conventional integrated DC-to-DC power module utilizes the isolated resonant converter for reducing the loss of the converter by resonant technique. Further, through increasing the switch frequency, the efficiency of the converter is enhanced, and the size of the converter is reduced. However, while increasing the switch frequency of power components, the transient current and voltage caused by high-speed switching bring about serious electromagnetic interference.

Therefore, there is a need of providing a resonant converter and a manufacturing method of a transformer thereof in order to overcome the above drawbacks.

SUMMARY OF THE INVENTION

An object of the present disclosure provides a resonant converter and a manufacturing method of a transformer thereof. The element of the resonant converter, the first branch circuit and the second branch circuit are symmetrically located with respect to the element. Therefore, the common mode currents generated by the voltage passing through the parasitic capacitances between the primary winding and the secondary winding of the transformer cancel each other out. Moreover, the electromagnetic interference is prevented from being generated by switching.

Another object of the present disclosure provides a resonant converter and a manufacturing method of a transformer thereof. The primary winding is wound around the plural middle pillars of the magnetic core assembly. The directions of two lines of magnetic field, which are formed by the electricity passing through the primary windings wound around any two neighboring middle pillars respectively, are opposite to each other.

Another object of the present disclosure provides a resonant converter and a manufacturing method of a transformer thereof. The primary and secondary windings of the transformer are wound around the same magnetic core assembly. Therefore, the loss and size of the transformer are reduced.

In accordance with an aspect of the present disclosure, there is provided a resonant converter. The resonant converter includes a full bridge circuit, an element, a first branch circuit, a second branch circuit and at least one secondary winding. The full bridge circuit includes a first switch, a second switch, a third switch and a fourth switch. There is a first node between the first switch and the fourth switch, and there is a second node between the second switch and the third switch. The element includes at least one inductor or at least one capacitor. The first branch circuit includes a first primary winding. The second branch circuit includes a second primary winding, and the first and second primary windings have the same turn number. The transformer is constructed by the first and second primary windings and the at least one secondary winding. The first branch circuit, the element and the second branch circuit are sequentially coupled in series between the first node and the second node. The first branch circuit and the second branch circuit are symmetrically located with respect to the element. The first and second branch circuits have the same impedance.

In accordance with another aspect of the present disclosure, there is further provided a manufacturing method of a transformer. The manufacturing method comprising the following steps (a), (b), (c) and (d). (a) providing a magnetic core assembly, wherein the magnetic core assembly includes a first middle pillar, a second middle pillar, a third middle pillar, a fourth middle pillar, two side pillars and a base plate connected to each other; (b) providing two primary windings and two secondary windings, wherein the two primary windings are a first primary winding and a second primary winding having the same turn number, and the two secondary windings are a first secondary winding and a second secondary winding having the same turn number; (c) winding the first primary winding around the first and second middle pillars, and winding the second primary winding around the third and fourth middle pillars, wherein on the first middle pillar, the second middle pillar, the third middle pillar and the fourth middle pillar, the directions of two lines of magnetic field, which are caused by an electricity passing through the primary windings wound around any two neighboring middle pillars respectively, are opposite to each other; and (d) winding the first secondary winding around the first and second middle pillars, and winding the second secondary winding around the third and fourth middle pillars.

The above contents of the present disclosure will become more readily apparent to those ordinarily skilled in the art after reviewing the following detailed description and accompanying drawings, in which:

BRIEF DESCRIPTION OF THE DRAWINGS

FIG. 6A and FIG. 6B schematically shows the winding way of the primary winding of FIG. 5;

FIG. 11 is a flowchart illustrating a manufacturing method of a transformer according to an embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
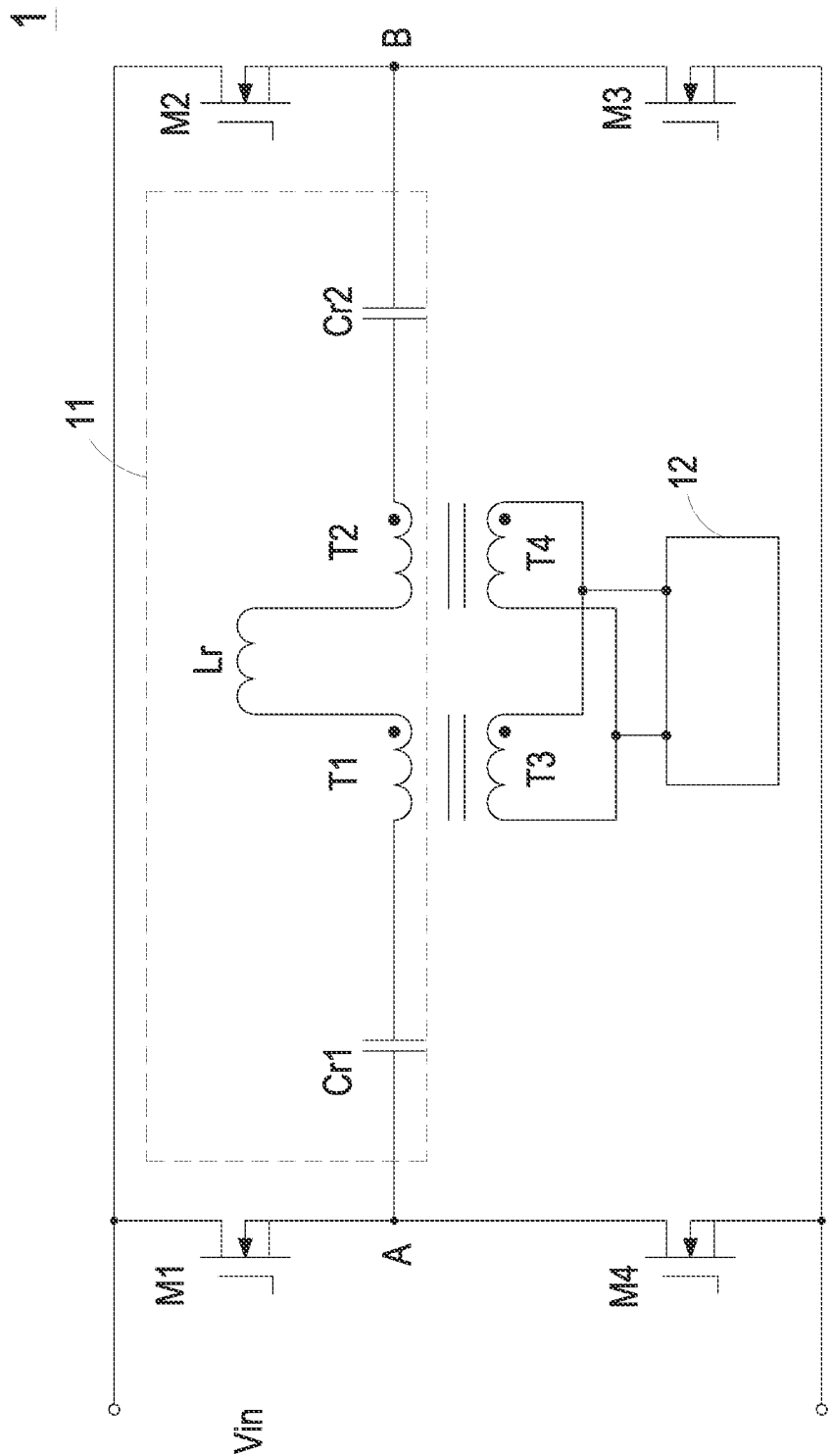
FIG. 1 is a schematic circuit diagram illustrating a resonant converter according to an embodiment of the present disclosure.

FIG. 1 is a schematic circuit diagram illustrating a resonant converter according to an embodiment of the present disclosure. As shown in FIG. 1, the resonant converter 1 of the present disclosure includes a full bridge circuit, a resonant inductor Lr, a transformer, a first resonant capacitor Cr1 and a second resonant capacitor Cr2. The first resonant capacitor Cr1 equals the second resonant capacitor Cr2. Namely, the capacitance of the first resonant capacitor Cr1 equals or substantially equals the capacitance of the second resonant capacitor Cr2.

The full bridge circuit receives an input voltage Vin and includes a first switch M1, a second switch M2, a third switch M3 and a fourth switch M4. There is a first node A between the first switch M1 and the fourth switch M4. There is a second node B between the second switch M2 and the third switch M3. The transformer includes two primary windings and two secondary windings. The two primary windings include a first primary winding T1 and a second primary winding T2, and the first primary winding T1 and the second primary winding T2 have the same turn number. The two secondary windings include a first secondary winding T3 and a second secondary winding T4 having the same turn number, and the dotted terminals of the two secondary windings are coupled in parallel. The first primary winding T1 and the first secondary winding T3 are electromagnetically coupled to each other, and the second primary winding T2 and the second secondary winding T4 are electromagnetically coupled to each other.

The first resonant capacitor Cr1, the first primary winding T1, the resonant inductor Lr, the second primary winding T2 and the second resonant capacitor Cr2 are sequentially coupled in series and are all disposed between the first node A and the second node B. The first resonant capacitor Cr1 is coupled to the first node A, and the second resonant capacitor Cr2 is coupled to the second node B. As shown in FIG. 1, the first resonant capacitor Cr1, the first primary winding T1, the resonant inductor Lr, the second primary winding T2 and the second resonant capacitor Cr2 are sequentially coupled in series to form a branch circuit 11. In the branch circuit 11, the components at the two sides of the resonant inductor Lr are symmetrical with respect to the resonant inductor Lr.

Figure 2:
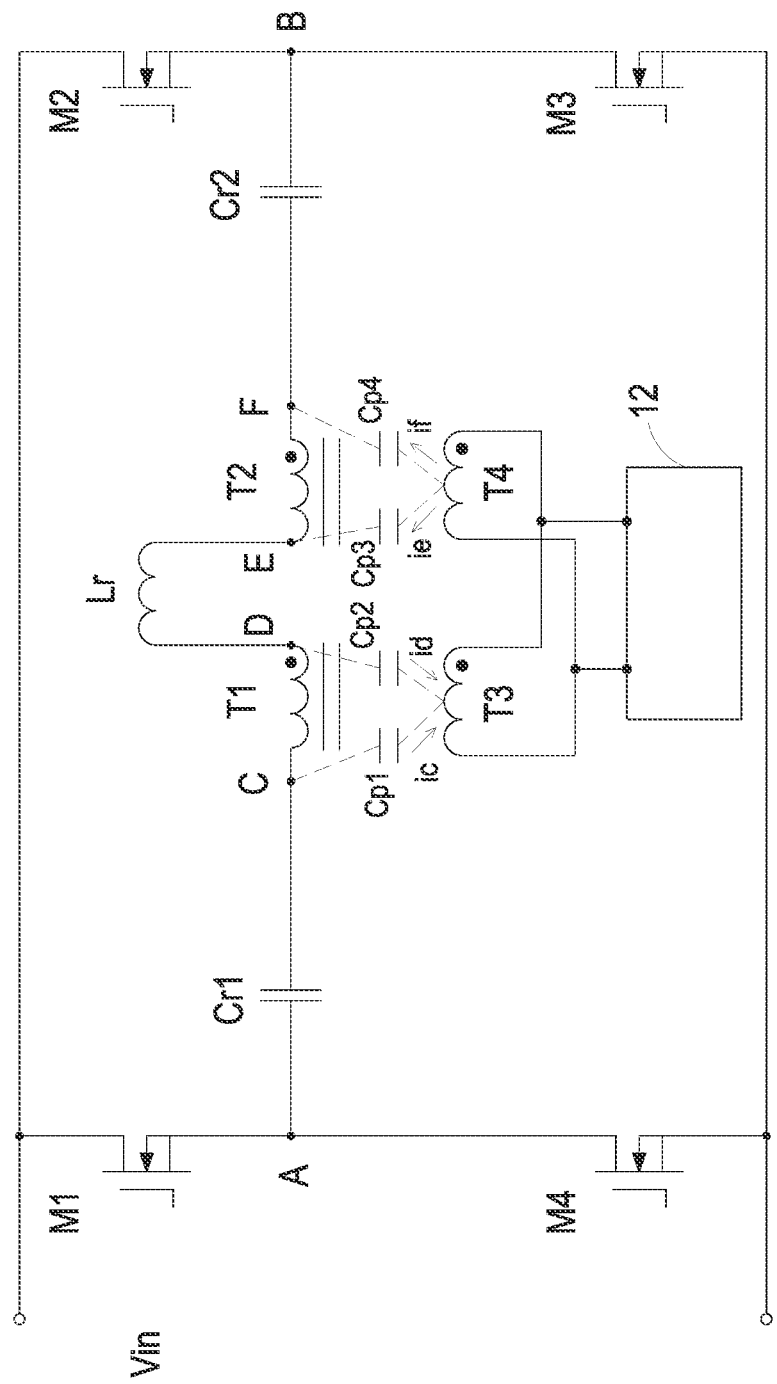
FIG. 2 is a schematic circuit diagram for showing the equivalent parasitic capacitances between the primary and secondary windings of FIG. 1.

In this embodiment, the primary windings T1 and T2 and the secondary windings T3 and T4 are coupled together through the magnetic core to construct the transformer. There are a plurality of parasitic capacitances among the primary windings T1 and T2 and the secondary windings T3 and T4, and the equivalent circuit including these parasitic capacitances is shown in FIG. 2. There are a first equivalent parasitic capacitance Cp1 and a second equivalent parasitic capacitance Cp2 between the first primary winding T1 and the first secondary winding T3. There are a third equivalent parasitic capacitance Cp3 and a fourth equivalent parasitic capacitance Cp4 between the second primary winding T2 and the second secondary winding T4. There are a third node C and a fourth node D at the two sides of the first primary winding T1 respectively, and the fourth node D is between the first primary winding T1 and the resonant inductor Lr. There are a fifth node E and a sixth node F at the two sides of the second primary winding T2 respectively, and the fifth node E is between the second primary winding T2 and the resonant inductor Lr. The first equivalent parasitic capacitance Cp1 is electrically connected between the third node C and the center point of the first secondary winding T3. The second equivalent parasitic capacitance Cp2 is electrically connected between the fourth node D and the center point of the first secondary winding T3. The third equivalent parasitic capacitance Cp3 is electrically connected between the fifth node E and the center point of the second secondary winding T4. The fourth equivalent parasitic capacitance Cp4 is electrically connected between the sixth node F and the center point of the second secondary winding T4. The potentials at the third node C, the fourth node D, the fifth node E and the sixth node F pass through the first equivalent parasitic capacitance Cp1, the second equivalent parasitic capacitance Cp2, the third equivalent parasitic capacitance Cp3 and the fourth equivalent parasitic capacitance Cp4 respectively, and thus the common mode currents ic, id, ie and if are generated correspondingly. Since the first primary winding T1 and the second primary winding T2 are symmetrically located with respect to the resonant inductor Lr, the kickback voltages at the third node C and the sixth node F have opposite directions and the same magnitude. The first equivalent parasitic capacitance Cp1 and the fourth equivalent parasitic capacitance Cp4 have the same capacitance, so that the common mode currents is and if cancel each other out. For the same reason, the kickback voltages at the fourth node D and the fifth node E have opposite directions and the same magnitude. The second equivalent parasitic capacitance Cp2 and the third equivalent parasitic capacitance Cp3 have the same capacitance, so that the common mode currents id and ie cancel each other out. Consequently, the common mode currents caused by the parasitic capacitances cancel each other out, the common mode noise among the primary windings T1 and T2 and the secondary windings T3 and T4 is greatly decreased, and the size of the common mode filter can be greatly reduced as well.

Figure 3:
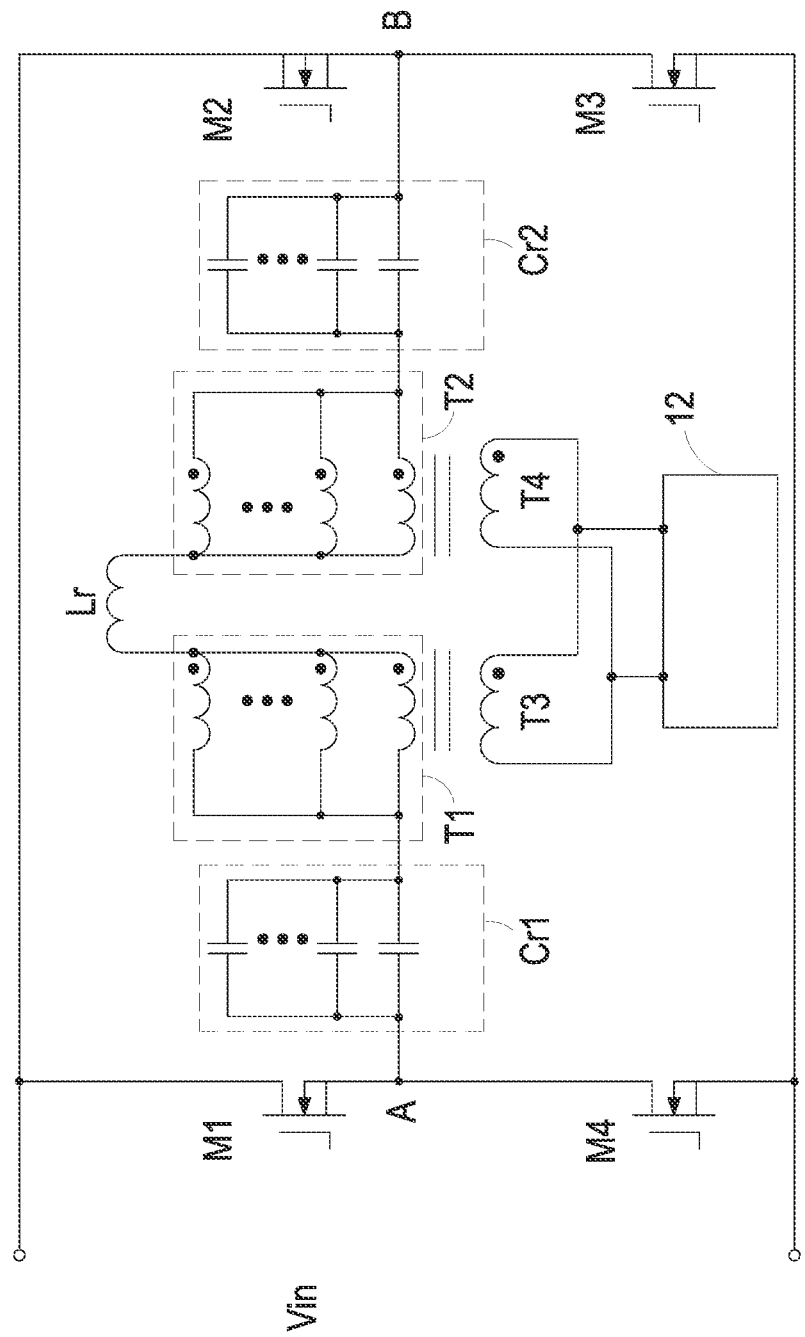
FIG. 3 is a schematic circuit diagram illustrating a variant of the resonant converter of FIG. 1.

FIG. 3 is a schematic circuit diagram illustrating a variant of the resonant converter of FIG. 1. As shown in FIG. 3, in an embodiment, the first primary winding T1 and the second primary winding T2 are both constructed by plural windings connected to each other in parallel so as to satisfy the requirements of large current. In an embodiment, the first resonant capacitor Cr1 and the second resonant capacitor Cr2 are both constructed by plural resonant capacitors connected to each other in parallel. Namely, according to actual requirements, the number of the resonant capacitors connected in parallel can be adjusted so as to adjust the capacitances of the first resonant capacitor Cr1 and the second resonant capacitor Cr2.

A specific structure of the transformer of the resonant converter 1 and the winding way of the primary winding of the transformer are exemplified as follows, but the actual implementations thereof are not limited thereto.

Figure 4A:
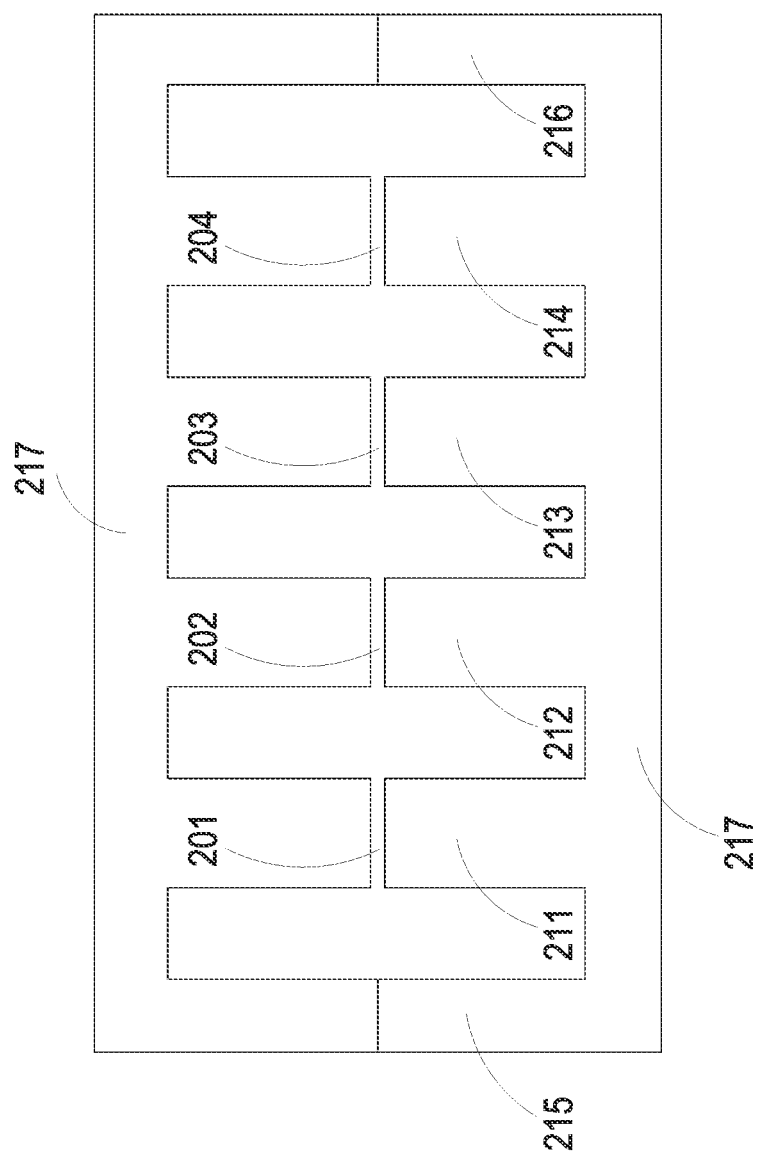
FIG. 4A and FIG. 4B are schematic cross-sectional views illustrating the magnetic core assembly of the transformer of FIG. 1.
Figure 4B:
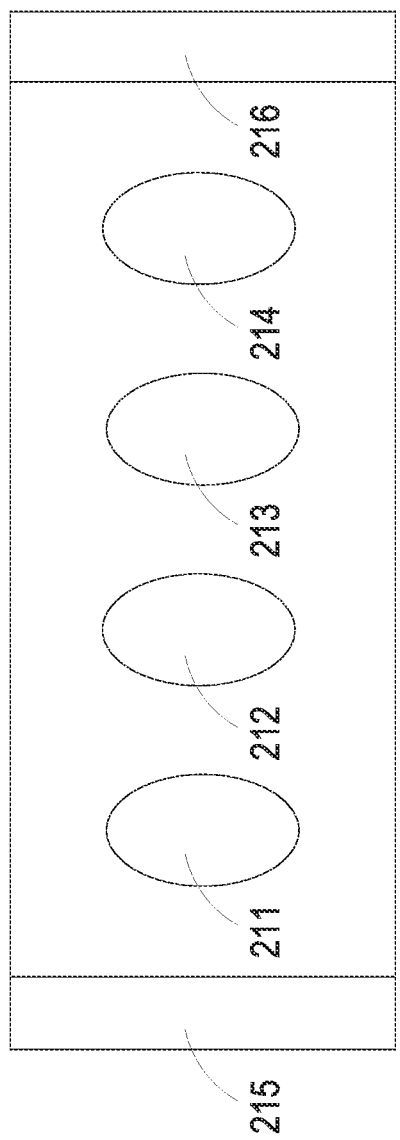

FIG. 4A and FIG. 4B are schematic cross-sectional views illustrating the magnetic core assembly of the transformer of FIG. 1. As shown in FIG. 4A, the transformer includes a magnetic core assembly 200, and the magnetic core assembly 200 includes two magnetic cores. The two magnetic cores are assembled with each other and construct a first middle pillar 211, a second middle pillar 212, a third middle pillar 213, a fourth pillar 214 and two side pillars 215 and 216. The air gaps 201, 202, 203 and 204 are located on the first middle pillar 211, the second middle pillar 212, the third middle pillar 213 and the fourth middle pillar 214 respectively. The magnetic core assembly 200 further includes a base plate 217. In addition, the shape of cross section of the first middle pillar 211, the second middle pillar 212, the third middle pillar 213, the fourth middle pillar 214 and the two side pillars 215 and 216 are not limited. As shown in FIG. 4B, for example but not exclusively, the cross sections of the first middle pillar 211, the second middle pillar 212, the third middle pillar 213 and the fourth middle pillar 214 are elliptical, and the cross sections of the two side pillars 215 and 216 are square. In an embodiment, the first primary winding T1 and the first secondary winding T3 are wound around the first middle pillar 211 and the second middle pillar 212. The first primary winding T1 and the first secondary winding T3 are electromagnetically coupled to each other to construct a first independent transformer. The second primary winding T2 and the second secondary winding T4 are wound around the third middle pillar 213 and the fourth middle pillar 214. The second primary winding T2 and the second secondary winding T4 are electromagnetically coupled to each other to construct a second independent transformer.

Figure 5:
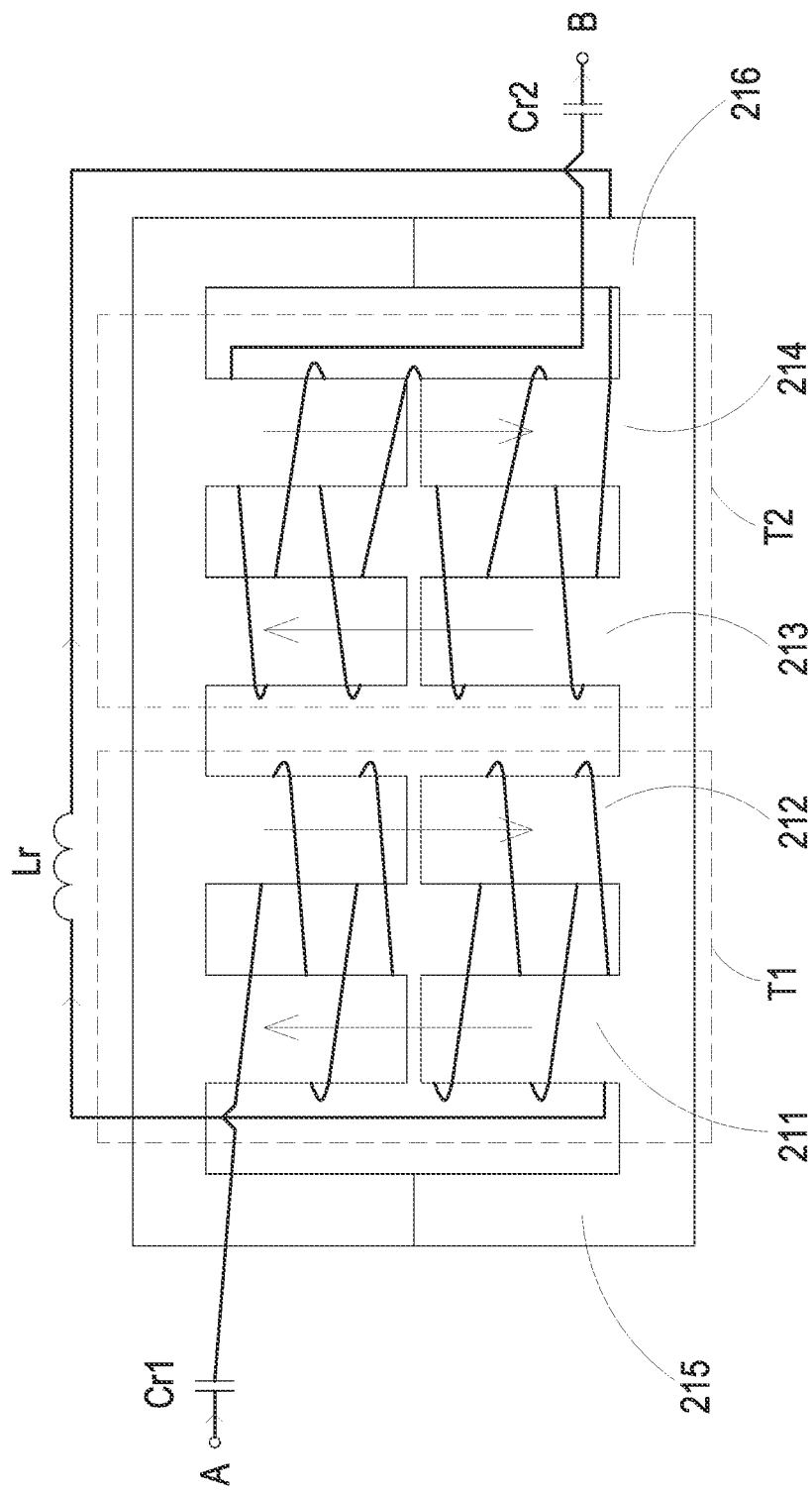
FIG. 5 schematically shows the primary winding of FIG. 1 being wound around the magnetic core assembly of FIG. 4A.
Figure 6B:
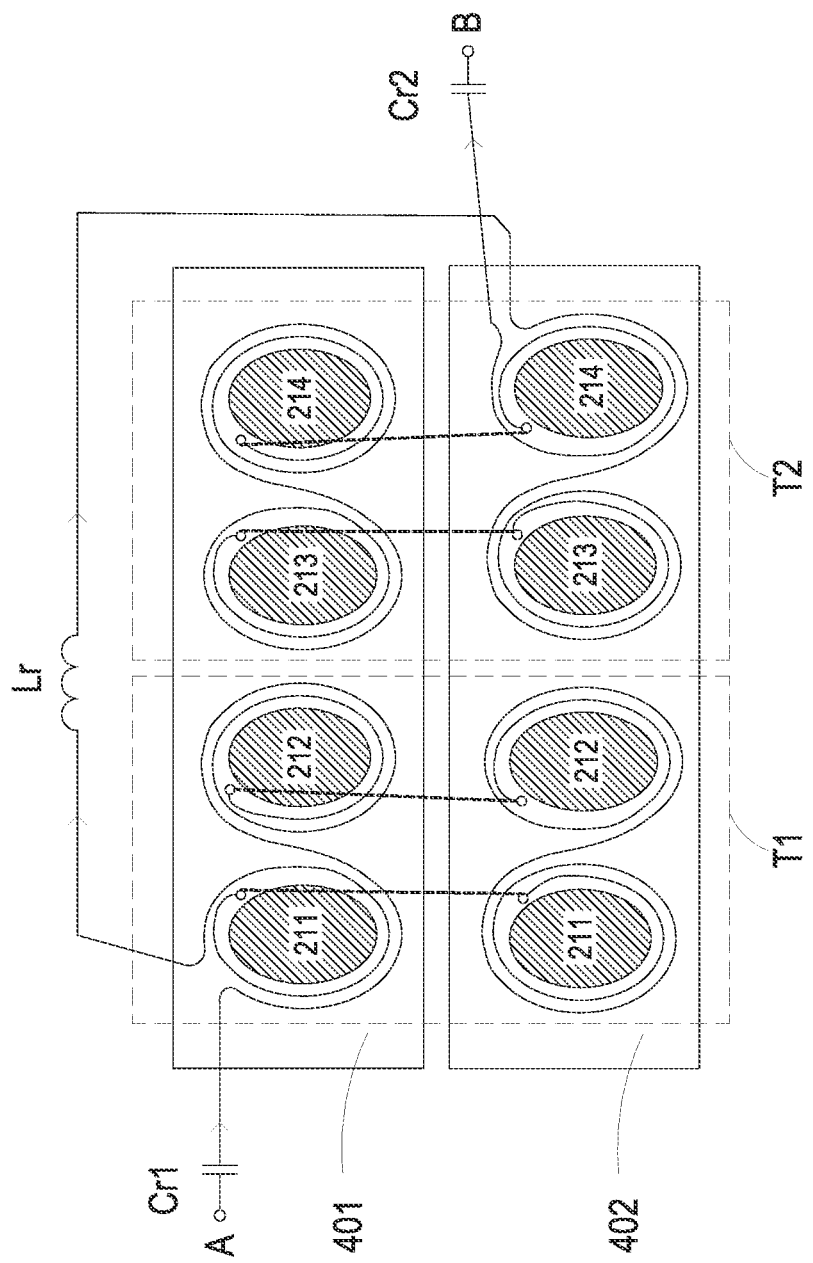

FIG. 5 schematically shows the primary winding being wound around the magnetic core assembly 200. FIG. 6A and FIG. 6B schematically shows the winding way of primary winding. As shown in FIG. 5, a set of winding is alternately wound around the first middle pillar 211 and the second middle pillar 212 to construct the first primary winding T1. Another set of winding is alternately wound around the third middle pillar 213 and the fourth middle pillar 214 to construct the second primary winding T2. As an example, the current is input at the first node A, transmitted through first resonant capacitor Cr1, the first primary winding T1, the resonant inductor Lr, the second primary winding T2 and the second resonant capacitor Cr2, and is outputted from the second node B. The first primary winding T1 and the second primary winding T2 are symmetrically located at the two sides of the resonant inductor Lr. The current passing through first primary winding T1 and the second primary winding T2 wound around the middle pillars causes the forming of the line magnetic field. From the front viewpoint of FIG. 5, the direction of the line of magnetic field generated by the first primary winding T1 wound around the first middle pillar 211 is upward. The direction of the line of magnetic field generated by the first primary winding T1 wound around the second middle pillar 212 is downward. The direction of the line of magnetic field generated by the second primary winding T2 wound around the third middle pillar 213 is upward. The direction of the line of magnetic field generated by the second primary winding T2 wound around the fourth middle pillar 214 is downward. It is noted that the directions of two lines of magnetic field, which are generated by the primary windings wound around any two neighboring middle pillars (e.g., the second middle pillar 212 and the third middle pillar 213) respectively, are opposite to each other. Consequently, when the alternating magnetic flux of the neighboring middle pillars flow to any side pillar (e.g., the side pillar 215 or 216), the respective alternating magnetic flux generated on this side pillar has opposite directions, and thereby the total alternating magnetic flux on the side pillar is less than the alternating magnetic flux on each middle pillar, and the alternating magnetic flux passing through the base plate 217 is less than the alternating magnetic flux on the middle pillar. Therefore, the cross-sectional area of base plates of side pillar and magnetic core are reduced and are both smaller than the cross-sectional area of middle pillar, which reduces the size of magnetic core and increases the power density.

In detail, the components of the resonant converter shown in FIGS. 1 to 5 are disposed on the circuit board including a plurality of inner plates. The first middle pillar 211, the second middle pillar 212, the third middle pillar 213 and the fourth middle pillar 214 of the magnetic core assembly 200 are inserted into the plurality of inner plates of the circuit board. The primary winding is disposed on an even number of inner plates of the circuit board. A plurality of through holes is disposed between inner plates for providing the electrical connection between inner plates. As shown in FIG. 6A, in this embodiment, the circuit board includes at least four inner plates. The primary winding is disposed on the four inner plates, and the electrical connections among the four inner plates are realized by the plurality of through holes. The four inner plates include a first inner plate 301, a second inner plate 302, a third inner plate 303 and the fourth inner plate 304. In this embodiment, the first primary winding T1 is wound for two turns around the first middle pillar 211 and the second middle pillar 212 respectively. Namely, the first primary winding T1 is wound for four turns at each inner plate, and the first primary winding T1 totally has sixteen turns, but not exclusively. In the following descriptions about FIG. 6A, the clockwise and counterclockwise directions are determined at the visual angle from the first inner plate 301 to the second inner plate 302.

The first inner plate 301, the second inner plate 302, the third inner plate 303 and the fourth inner plate 304 are arranged in sequence. The first primary winding T1 is connected to the first resonant capacitor Cr1. At the direction from the first inner plate 301 to the second inner plate 302, the winding way of the first primary winding T1 is exemplified as follows. First, on the first inner plate 301, the first primary winding T1 is wound around the first middle pillar 211 in counterclockwise direction, wound around the second middle pillar 212 in clockwise direction, and electrically connected to the second inner plate 302 via the through hole 311. Then, on the second inner plate 302, the first primary winding T1 is wound around the second middle pillar 212 in clockwise direction, wound around the first middle pillar 211 in counterclockwise direction, and electrically connected to the third inner plate 303 via the through hole 312. Afterward, on the third inner plate 303, the first primary winding T1 is wound around the first middle pillar 211 in counterclockwise direction, wound around the second middle pillar 212 in clockwise direction, and electrically connected to the fourth inner plate 304 via the through hole 313. Finally, on the fourth inner plate 304, the first primary winding T1 is wound around the second middle pillar 212 in clockwise direction, wound around the first middle pillar 211 in counterclockwise direction, and electrically connected to the first inner plate 301 via the through hole 314. On the first inner plate 301, the first primary winding T1 is wound around the first middle pillar 211 and is connected to one terminal of the resonant inductor Lr.

The other terminal of the resonant inductor Lr is connected to the second primary winding T2. At the direction from the fourth inner plate 304 to the third inner plate 303, the winding way of the second primary winding T2 is exemplified as follows. First, on the fourth inner plate 304, the second primary winding T2 is wound around the fourth middle pillar 214 in clockwise direction, wound around the third middle pillar 213 in counterclockwise direction, and electrically connected to the third inner plate 303 via the through hole 315. Then, on the third inner plate 303, the second primary winding T2 is wound around the third middle pillar 213 in counterclockwise direction, wound around the fourth middle pillar 214 in clockwise direction, and electrically connected to the second inner plate 302 via the through hole 316. Afterward, on the second inner plate 302, the second primary winding T2 is wound around the fourth middle pillar 214 in clockwise direction, wound around the third middle pillar 213 in counterclockwise direction, and electrically connected to the first inner plate 301 via the through hole 317. Finally, on the first inner plate 301, the second primary winding T2 is wound around the third middle pillar 213 in counterclockwise direction, wound around the fourth middle pillar 214 in clockwise direction, and electrically connected to the fourth inner plate 304 via the through hole 318. On the fourth inner plate 304, the second primary winding T2 is wound around the fourth middle pillar 214 in clockwise direction and is connected to the second resonant capacitor Cr2.

In the embodiment shown in FIG. 6A, on each inner plate, the first primary winding T1 is always wound around the first middle pillar 211 in counterclockwise direction and is always wound around second middle pillar 212 in clockwise direction. Further, on each inner plate, the second primary winding T2 is always wound around the third middle pillar 213 in counterclockwise direction and is always wound around fourth middle pillar 214 in clockwise direction. From the directions of the primary winding being wound around the middle pillars, it is known that the directions of two lines of magnetic field caused by the current passing through the primary windings wound around any two neighboring middle pillars respectively are opposite to each other. Consequently, when the alternating magnetic flux of the neighboring middle pillars flow to any side pillar, the respective alternating magnetic flux generated on this side pillar has opposite directions, and thereby the total alternating magnetic flux on the side pillar is less than the alternating magnetic flux on the middle pillar, and the alternating magnetic flux passing through the base plate 217 is less than the alternating magnetic flux on the middle pillar. Therefore, the cross-sectional area of base plates of side pillar and magnetic core are reduced and are both smaller than the cross-sectional area of middle pillar, which reduces the size of magnetic core and increases the power density. In addition, the first primary winding T1 and the second primary winding T2 are symmetrically located with respect to the resonant inductor Lr, and the first resonant capacitor Cr1 and the second resonant capacitor Cr2 are symmetrically located with respect to the resonant inductor Lr. Furthermore, the winding direction of the primary windings T1 and T2 is not limited thereto. For example, the first primary winding T1 may be always wound around the first middle pillar 211 and the second middle pillar 212 in clockwise and counterclockwise directions respectively, and the second primary winding T2 may be always wound around the third middle pillar 213 and the fourth middle pillar 214 in clockwise and counterclockwise directions respectively.

Naturally, the number of the inner plate is no limited to four. For example, in the embodiment shown in FIG. 6B, the circuit board includes two inner plates 401 and 402. The primary winding is disposed on the two inner plates 401 and 402. The winding way of the first primary winding T1 and the second primary winding T2 is similar to that shown in FIG. 6A, and the detailed description thereof is omitted herein. Actually, the number of the inner plate can be any even number, and the corresponding winding way of the first and second primary windings T1 and T2 can be deduced from the embodiment shown in FIGS. 6A and 6B. Regardless of the number of the inner plate, the directions of two lines of magnetic field caused by the current passing through the primary windings wound around any two neighboring middle pillars respectively are opposite to each other. The first resonant capacitor Cr1, the first primary winding T1, the resonant inductor Lr, the second primary winding T2 and the second resonant capacitor Cr2 are sequentially coupled in series.

In the resonant converter of the present disclosure, the implementation of the transformer and the series branch circuit between the first and second nodes A and B are not limited to above embodiments and can be adjusted according to actual requirements. The possible implementation thereof is exemplified as follows, but not exclusively.

Figure 7A:
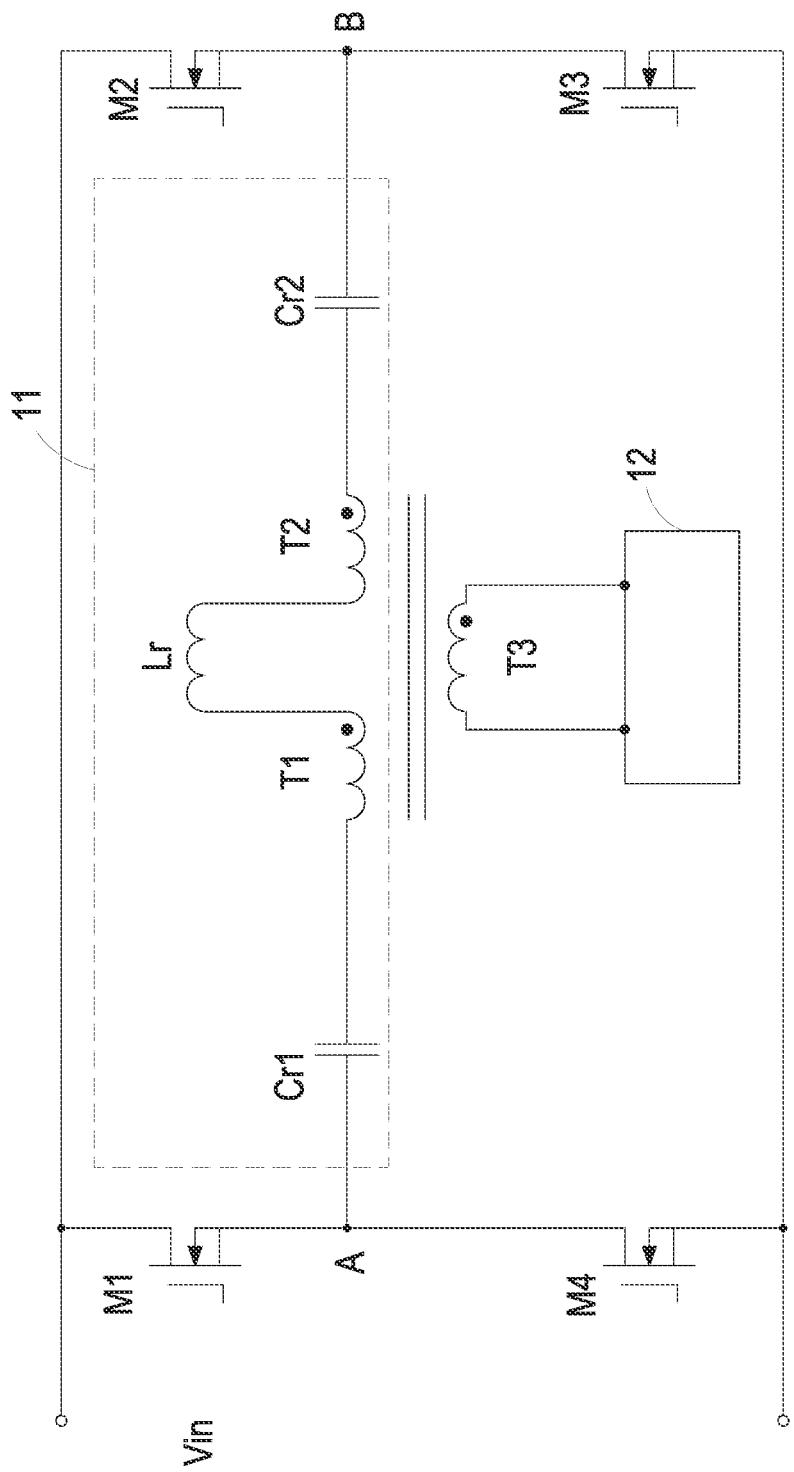
FIG. 7A is a schematic circuit diagram illustrating a variant of the transformer of FIG. 1.
Figure 7B:
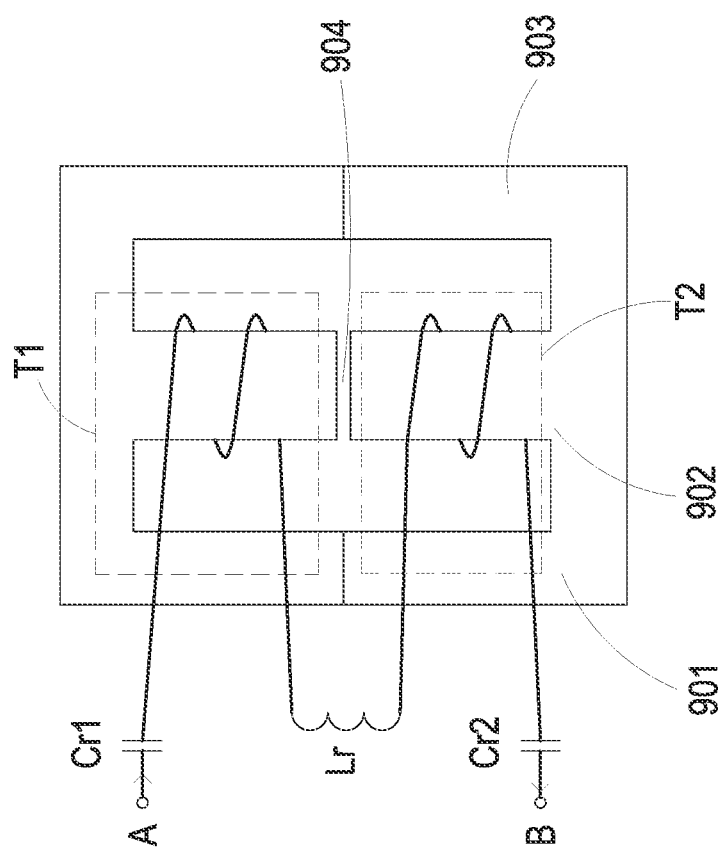
FIG. 7B schematically shows the primary winding of FIG. 7A being wound around the magnetic core assembly.

In an embodiment, as shown in FIG. 7A, the transformer of the resonant converter 1 may include two primary windings T1 and T2 and one secondary winding T3 coupled to each other. In this embodiment, the first primary winding T1, the second primary winding T2 and the first secondary winding T3 share one magnetic core. As shown in FIG. 7B, the magnetic core assembly is formed by two E-type magnetic cores, and the magnetic core assembly includes a middle pillar 902 and two side pillars 901 and 903. There is an air gap 904 on the middle pillar 902. One terminal of the first primary winding T1 is coupled to the first resonant capacitor Cr1, the first primary winding T1 is wound for required turns around the middle pillar 902, and the other terminal of the first primary winding T1 is coupled to the resonant inductor Lr. One terminal of the second primary winding T2 is coupled to the resonant inductor Lr, the second primary winding T2 is wound around the middle pillar 902 in same direction as the first primary winding T1, and the other terminal of the second primary winding T2 is coupled to the second resonant capacitor Cr2. The first secondary winding T3 is also wound around the middle pillar (not shown).

Figure 8:
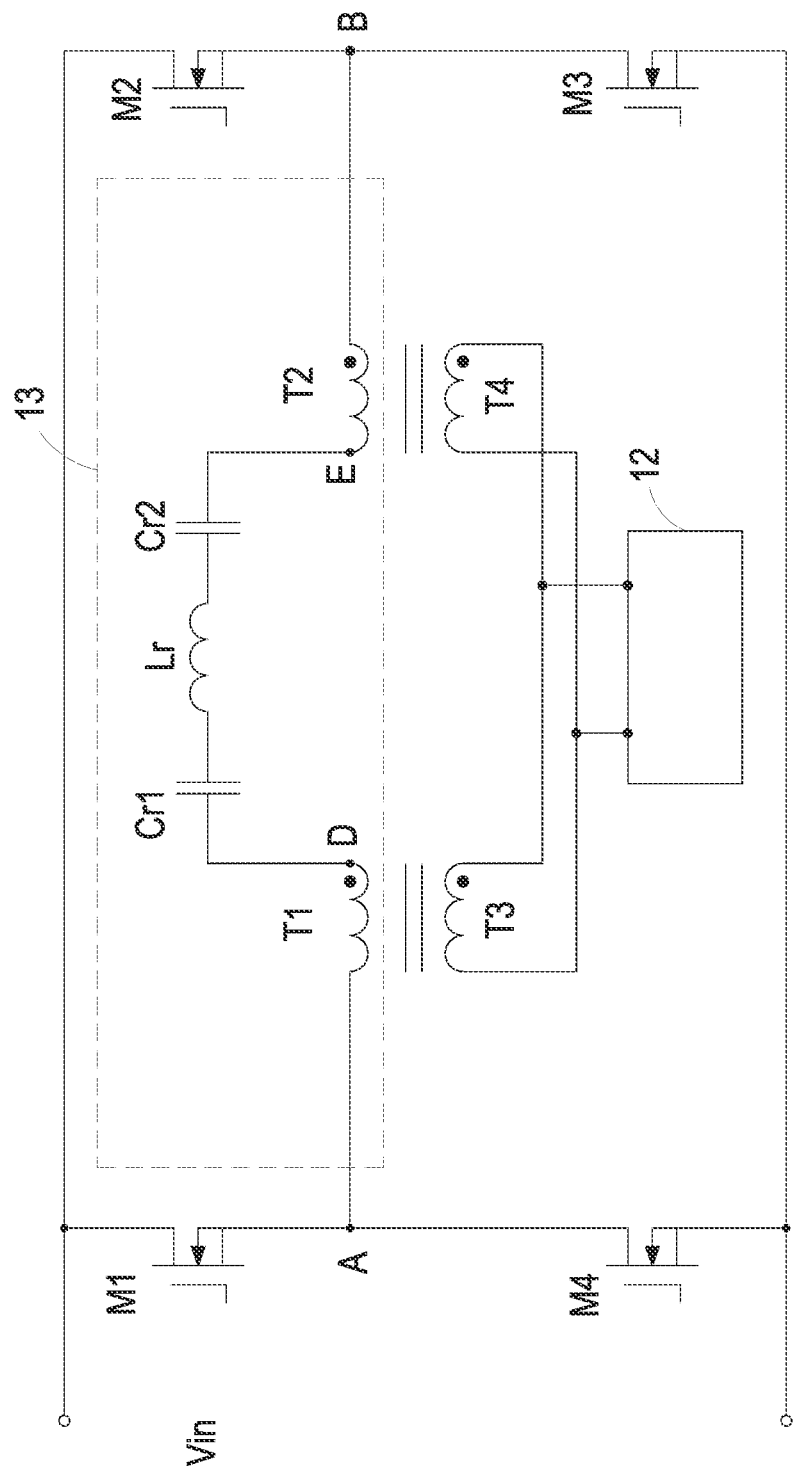
FIG. 8, FIG. 9 and FIG. 10 are schematic circuit diagrams illustrating variants of the series branch circuit between the first and second nodes of FIG. 1.

In an embodiment, the series branch circuit between the first node A and the second node B may be a branch circuit 13. The branch circuit 13 comprises the first primary winding T1, the first resonant capacitor Cr1, the resonant inductor Lr, the second resonant capacitor Cr2 and the second primary winding T2 being sequentially coupled in series. As shown in FIG. 8, in the branch circuit 13, there are the first node A and the fourth node D at the two sides of the first primary winding T1, and there are the fifth node E and the second node B at the two sides of the second primary winding T2. The components at the two sides of the resonant inductor Lr are symmetrically located with respect to the resonant inductor Lr. Therefore, the kickback voltages at the first node A and the second node B have opposite directions and the same magnitude. For the same reason, the kickback voltages at the fourth node D and the fifth node E have opposite directions and the same magnitude. Moreover, since the branch circuit 13 are symmetrically distributed with respect to the resonant inductor Lr, the parasitic capacitance between the first node A and the center point of the first secondary winding T3 is equal to that between the second node B and the center point of the second secondary winding T4. For the same reason, the parasitic capacitance between the fourth node D and the center point of the first secondary winding T3 is equal to that between the fifth node E and the center point of the second secondary winding T4. Consequently, the common mode currents caused by the parasitic capacitances cancel each other out, the common mode noise among the primary windings T1 and T2 and the secondary windings T3 and T4 is greatly decreased, and the size of the common mode filter can be greatly reduced as well.

Figure 9:
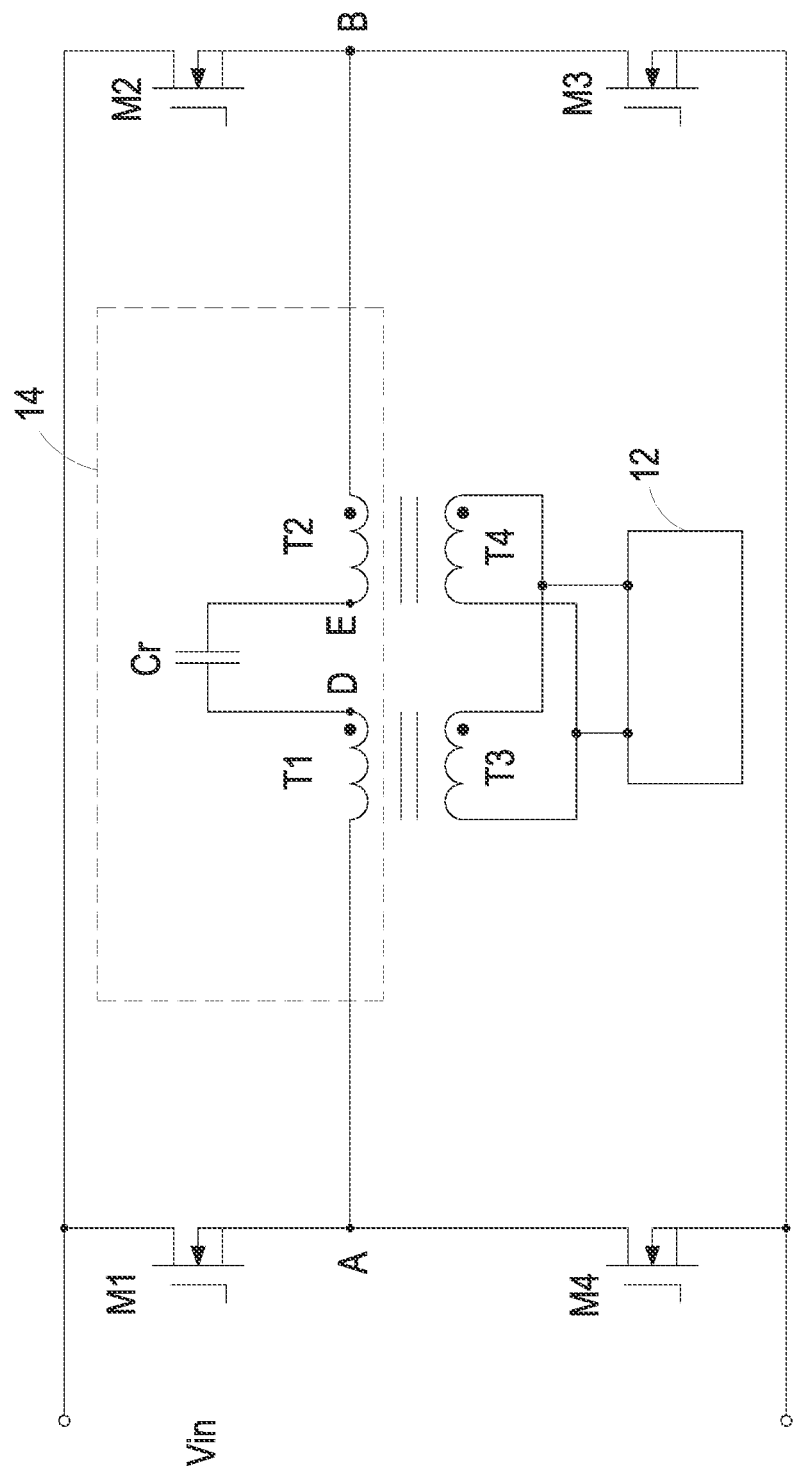

In an embodiment, the leakage inductance of the transformer may act as resonant inductor, so that the resonant inductor Lr is omitted. As shown in FIG. 9, the resonant converter includes the above-mentioned full bridge circuit, the transformer and the resonant capacitor Cr. The transformer and the full bridge circuit is similar to that in above embodiments, and the detailed description thereof is omitted herein. In the branch circuit 14 of this embodiment, the first primary winding T1 and the second primary winding T2 are coupled to the two terminals of the resonant capacitor Cr and are symmetrically located with respect to the resonant capacitor Cr. The symmetrical principle, the relations among the kickback voltages at the nodes at the two sides of the first and second primary windings, and the effect of the common mode currents cancelling each other out in this embodiment are all the same as that in above embodiments. Therefore, the detailed descriptions thereof are omitted herein.

Figure 10:
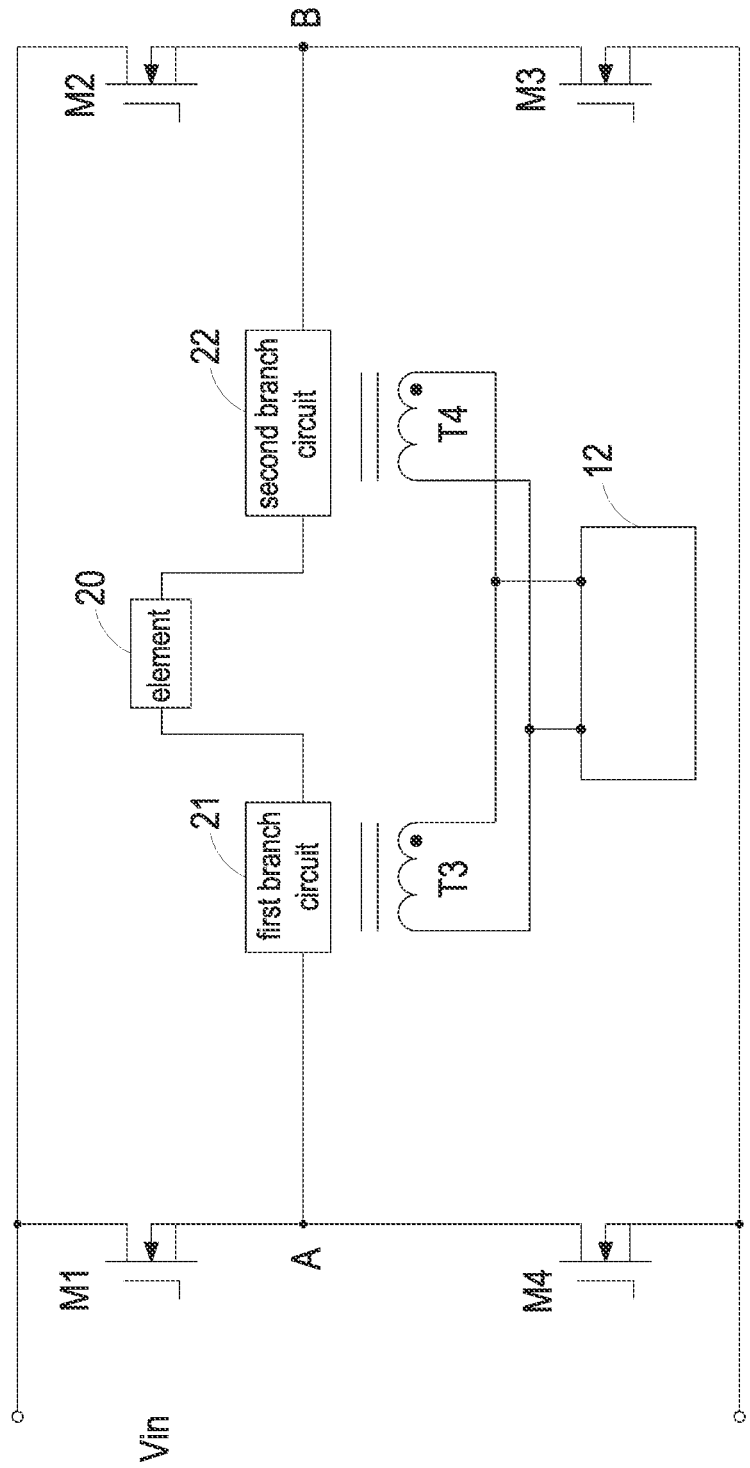

Please refer to FIG. 10. The series branch circuit between the first node A and the second node B includes an element 20, a first branch circuit 21 and a second branch circuit 22. The first branch circuit 21, the element 20 and the second branch circuit 22 are sequentially coupled in series. The first branch circuit 21 and the second branch circuit 22 are symmetrically located with respect to the element 20, and the impedances of the first and second branch circuits 21 and 22 are the same. The first branch circuit 21 includes a first primary winding, the second branch circuit 22 includes a second primary winding, and the turns of the first and second primary windings are the same. The element 20 includes at least one resonant inductor or at least one resonant capacitor. Through the symmetrical distribution about the element 20, the relations among the kickback voltages at the nodes at the two sides of the first and second primary windings are the same, and the effect of the common mode currents cancelling each other out is achieved by layout arrangement. Please refer to FIG. 10 with FIGS. 1, 3 and 7A. The element 20 is a resonant inductor, the first branch circuit 21 includes a first resonant capacitor and a first primary winding, and the second branch circuit 22 includes a second resonant capacitor and a second primary winding. The first resonant capacitor, the first primary winding, the resonant inductor, the second primary winding and the second resonant winding are sequentially coupled in series between the first node A and the second node B. Please refer to FIG. 10 with FIG. 8. The element 20 is a resonant inductor, the first branch circuit 21 includes a first resonant capacitor and a first primary winding, and the second branch circuit 22 includes a second resonant capacitor and a second primary winding. The first primary winding, the first resonant capacitor, the resonant inductor, the second resonant winding and the second primary winding are sequentially coupled in series between the first node A and the second node B. Please refer to FIG. 10 with FIG. 9. The element 20 is a resonant capacitor, the first branch circuit 21 includes a first primary winding, and the second branch circuit 22 includes a second primary winding. The first primary winding, the resonant capacitor and the second primary winding are sequentially coupled in series between the first node A and the second node B.

FIG. 11 is a flowchart illustrating a manufacturing method of a transformer according to an embodiment of the present disclosure. As shown in FIG. 11, the manufacturing method of transformer is used for manufacturing the above-mentioned transformer and includes the following steps.

In Step S1, a magnetic core assembly 200 is provided, and the magnetic core assembly 200 includes a first middle pillar 211, a second middle pillar 212, a third middle pillar 213, a fourth middle pillar 214, two side pillars 215 and 216 and a base plate 217 connected to each other.

In Step S2, two primary windings and two secondary windings are provided, the two primary windings are a first primary winding T1 and a second primary winding T2 having the same turn number, and the two secondary windings are a first secondary winding T3 and a second secondary winding T4 having the same turn number.

In Step S3, the first primary winding T1 is wound around the first middle pillar 211 and the second middle pillar 212, and the second primary winding T2 is wound around the third middle pillar 213 and the fourth middle pillar 214. On the first middle pillar 211, the second middle pillar 212, the third middle pillar 213 and the fourth middle pillar 214, the directions of two lines of magnetic field, which are caused by the electricity passing through the primary windings wound around any two neighboring middle pillars respectively, are opposite to each other.

In step S4, the first secondary winding T3 is wound around the first middle pillar 211 and the second middle pillar 212, and the second secondary winding T4 is wound around the third middle pillar 213 and the fourth middle pillar 214.

In an embodiment, two terminals of the first primary winding T1 are connected to the first resonant capacitor Cr1 and one terminal of the resonant inductor Lr respectively. Two terminals of the second primary winding T2 are connected to the second resonant capacitor Cr2 and the other terminal of the resonant inductor Lr respectively. The capacitance of the first resonant capacitor Cr1 equals or substantially equals the capacitance of the second resonant capacitor Cr2. In another embodiment, two terminals of the first resonant capacitor Cr1 are connected to the first primary winding T1 and one terminal of the resonant inductor Lr respectively. Two terminals of the second resonant capacitor Cr2 are connected to the second primary winding T2 and the other terminal of the resonant inductor Lr respectively. The first resonant capacitor Cr1 and the second resonant capacitor Cr2 have the same capacitance. In another embodiment, two terminals of the resonant capacitor Cr are connected to the first primary winding T1 and the second primary winding T2 respectively.

Figure 12A:
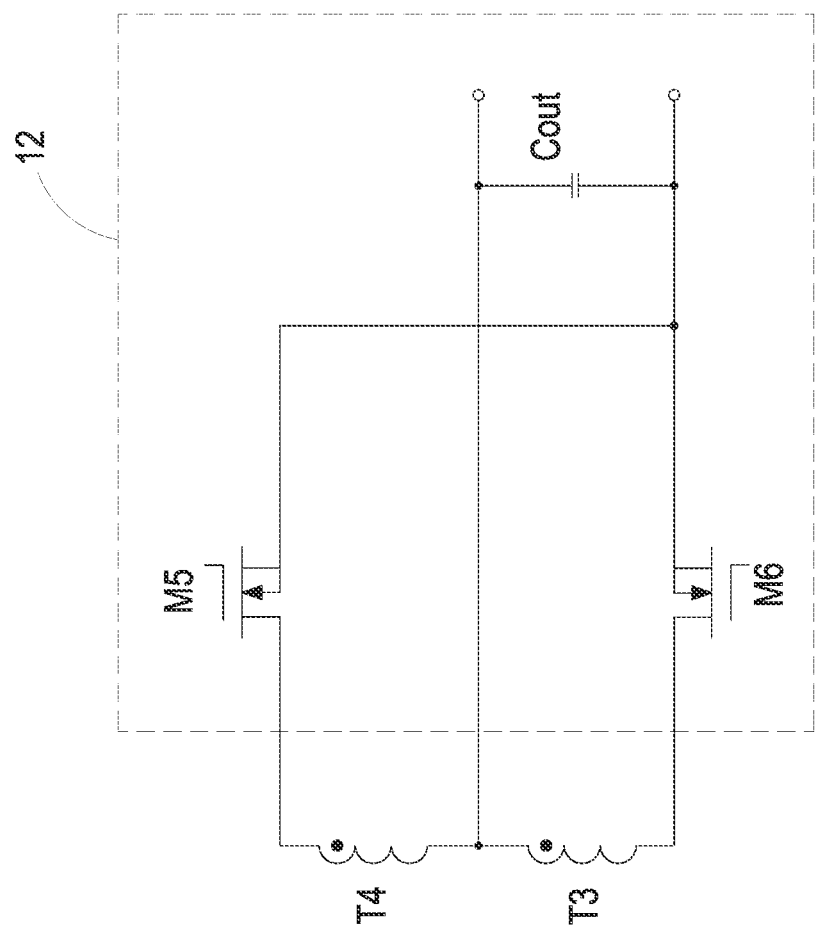
FIG. 12A and FIG. 12B are schematic circuit diagrams illustrating various rectifier circuit of the resonant converter of FIG. 1.
Figure 12B:
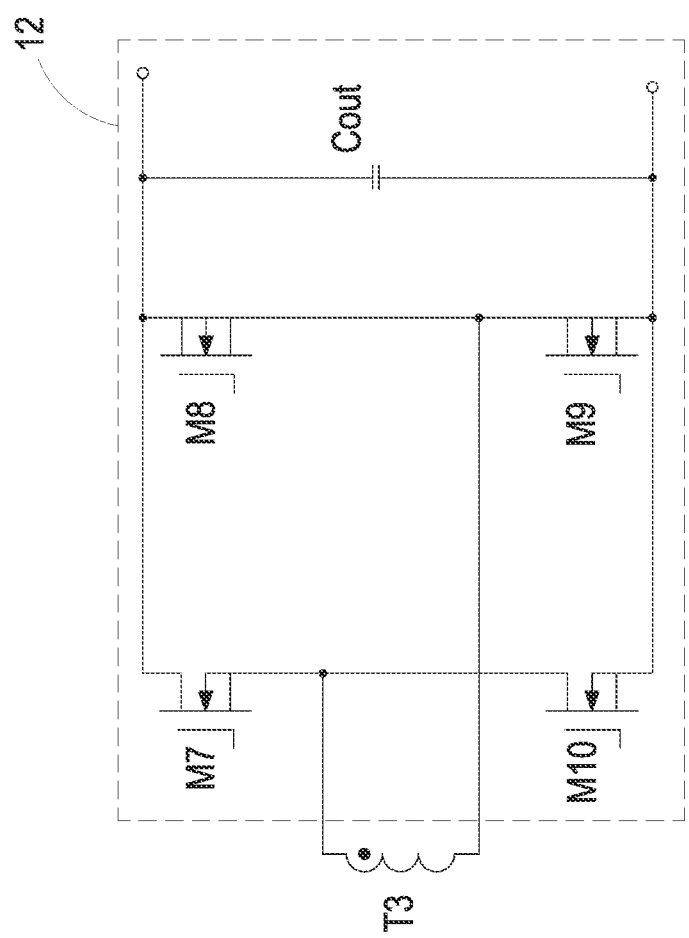

FIG. 12A and FIG. 12B are schematic circuit diagrams illustrating various rectifier circuit of the resonant converter of FIG. 1. In an embodiment, as shown in FIG. 12A and FIG. 12B, the resonant converter 1 further includes a rectifier circuit 12 connected to the secondary winding T3. The rectifier circuit 12 is for example but not limited to a full-wave rectifier circuit, a half-wave rectifier circuit or a center-tapped rectifier circuit. In the embodiment shown in FIG. 12A, the rectifier circuit 12 is a center-tapped rectifier circuit including two switches M5 and M6 and an output capacitor Cout. Two terminals of the first secondary winding T3 are electrically connected to one terminal of the switch M6 and one terminal of the output capacitor Cout respectively. Two terminals of the second secondary winding T4 are electrically connected to one terminal of the switch M5 and the one terminal of the output capacitor Cout respectively. The other terminal of the switches M5 and M6 are both electrically connected to the other terminal of the output capacitor Cout. In the embodiment shown in FIG. 12B, the rectifier circuit 12 is a full-wave rectifier circuit including four switches M7, M8, M9 and M10 and an output capacitor Cout. The transformer includes two primary windings T1 and T2 and one secondary winding T3. One terminal of the secondary winding T3 is electrically connected between the switch M7 and the switch M10, and the other terminal of the secondary winding T3 is electrically connected between the switch M8 and the switch M9. One terminal of the output capacitor Cout is electrically connected to the switches M7 and M8, and the other terminal of the output capacitor Cout is electrically connected to the switches M9 and M10.

In an embodiment, the resonant converter 1 further includes a controller (not shown). The controller is electrically connected to the full bridge circuit and is configured to generate the pulse width modulation signal according to the output voltage of the resonant converter 1. According to the pulse width modulation signal, the first switch M1, the second switch M2, the third switch M3 and the fourth switch M4 are turned on or off. In an embodiment, the switches are controlled to turn on or off with an unadjusted duty ratio of 50%.

From the above descriptions, the present invention provides a resonant converter and a manufacturing method of a transformer thereof. The element of the resonant converter, the first branch circuit and the second branch circuit are symmetrically located with respect to the element of the resonant converter. Therefore, the common mode currents generated by the voltage passing through the parasitic capacitances between the primary winding and the secondary winding of the transformer cancel each other out, and the electromagnetic interference is prevented from being generated by switching. In addition, the primary winding is wound around the plural middle pillars of the magnetic core assembly. The directions of two lines of magnetic field, which are formed by the electricity passing through the primary windings wound around any two neighboring middle pillars respectively, are opposite to each other. Therefore, the alternating magnetic flux of the neighboring middle pillars is cancelled out. Moreover, the primary and secondary windings of the transformer are wound around the same magnetic core assembly. Therefore, the loss and size of the transformer are reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic assembly, comprising:
   a first middle pillar, a second middle pillar, a third middle pillar and a fourth middle pillar disposed in sequence along a direction and arranged at intervals;
   a first winding wound around the first and second middle pillars; and
   a second winding wound around the third and fourth middle pillars;
   wherein an incoming terminal of the first winding and an outgoing terminal of the first winding are disposed neighboring to the first middle pillar and are disposed neighboring to each other,
   an incoming terminal of the second winding and an outgoing terminal of the second winding are disposed neighboring to the fourth middle pillar and are disposed neighboring to each other,
   a number of turns of the first winding is the same as a number of turns of the second winding, and
   the outgoing terminal of the first winding is electrically coupled to the incoming terminal of the second winding through an electronic component.

2. The magnetic assembly according to claim 1, wherein the first middle pillar has a first magnetic flux direction, the second middle pillar has a second magnetic flux direction, the third middle pillar has the first magnetic flux direction, the fourth middle pillar has the second magnetic flux direction, and the second magnetic flux direction is opposite to the first magnetic flux direction.

3. The magnetic assembly according to claim 1, wherein a winding direction of the first winding on the first middle pillar is opposite to a winding direction of the first winding on the second middle pillar, and a winding direction of the second winding on the third middle pillar is opposite to a winding direction of the second winding on the fourth middle pillar.

4. The magnetic assembly according to claim 1, wherein the electronic component is an additional inductor or an equivalent parasitic inductor.

5. The magnetic assembly according to claim 1, wherein the first winding and the second winding are both disposed on a printed circuit board, and both the number of turns of the first winding and the number of turns of the second winding are not less than four.

6. The magnetic assembly according to claim 5, wherein the printed circuit board comprises a first inner layer and a second inner layer;
   the number of turns of the first winding is 4N, where N≥1, the incoming and outgoing terminals of the first winding are disposed on the first inner layer, on the first inner layer, the first winding is wound from the incoming terminal for one turn around the first middle pillar in a first direction, wound for N turns around the second middle pillar in a second direction, and electrically coupled to the second inner layer via a first through hole in sequence;
   on the second inner layer, the first winding is wound for N turns around the second middle pillar in the second direction, wound for N turns around the first middle pillar in the first direction, and led out via a second through hole in sequence;
   the first direction is opposite to the second direction.

7. The magnetic assembly according to claim 6, wherein the first winding is electrically coupled to the first inner layer via the second through hole, and on the first inner layer, the first winding is unceasingly wound for (N−1) turns around the first middle pillar in the first direction and forms the outgoing terminal of the first winding.

8. The magnetic assembly according to claim 7, wherein the number of turns of the second winding is 4N, the incoming and outgoing terminals of the second winding are disposed on the second inner layer, on the second inner layer, the second winding is wound from the incoming terminal for one turn around the fourth middle pillar in the second direction, wound for N turns around the third middle pillar in the first direction, and electrically coupled to the first inner layer via a third through hole in sequence;

on the first inner layer, the second winding is unceasingly wound for N turns around the third middle pillar in the first direction, wound for N turns around the fourth middle pillar in the second direction, then electrically coupled to the second inner layer via a fourth through hole, and on the second inner layer, the second winding is unceasingly wound for (N−1) turns around the fourth middle pillar in the second direction and forms the outgoing terminal of the second winding.

9. The magnetic assembly according to claim 6, wherein the printed circuit board further comprises a third inner layer and a fourth inner layer, and N≥2;

on the second inner layer, the first winding is electrically coupled to the third inner layer via the second through hole;

on the third inner layer, the first winding is unceasingly wound for N turns around the first middle pillar in the first direction, wound for N turns around the second middle pillar in the second direction, and electrically coupled to the fourth inner layer via a fifth through hole in sequence;

on the fourth inner layer, the first winding is unceasingly wound for N turns around the second middle pillar in the second direction, wound for N turns around the first middle pillar in the first direction, and electrically coupled to the first inner layer via a sixth through hole, and on the first inner layer, the first winding is wound for (N−1) turns around the first middle pillar in the first direction and forms the outgoing terminal of the first winding.

10. The magnetic assembly according to claim 9, wherein the number of turns of the second winding is 4N, the incoming and outgoing terminals of the second winding are disposed on the fourth inner layer, on the fourth inner layer, the second winding is wound from the incoming terminal for one turn around the fourth middle pillar in the second direction, wound for N turns around the third middle pillar in the first direction, and electrically coupled to the third inner layer via a seventh through hole in sequence;

on the third inner layer, the second winding is unceasingly wound for N turns around the third middle pillar in the first direction, wound for N turns around the fourth middle pillar in the second direction, and electrically coupled to the second inner layer via an eighth through hole;

on the second inner layer, the second winding is unceasingly wound for N turns around the fourth middle pillar in the second direction, wound for N turns around the third middle pillar in the first direction, and electrically coupled to the first inner layer via a ninth through hole;

on the first inner layer, the second winding is unceasingly wound for N turns around the third middle pillar in the first direction, wound for N turns around the fourth middle pillar in the second direction, and electrically coupled to the fourth inner layer via a tenth through hole, and on the fourth inner layer, the second winding is wound for (N−1) turns around the fourth middle pillar in the second direction and forms the outgoing terminal of the second winding.

11. A magnetic assembly, comprising:
a first middle pillar and a second middle pillar disposed at intervals;
a winding wound around the first and second middle pillars; and
a printed circuit board, wherein the winding is disposed within the printed circuit board;
wherein the number of turns of the winding is 4N, where N≥1, an incoming terminal of the winding and an outgoing terminal of the winding are disposed neighboring to the first middle pillar and are disposed neighboring to each other,
the printed circuit board comprises a first inner layer and a second inner layer, and the incoming and outgoing terminals of the winding are located on the first inner layer.

12. The magnetic assembly according to claim 11, wherein the first middle pillar has a first magnetic flux direction, the second middle pillar has a second magnetic flux direction, and the second magnetic flux direction is opposite to the first magnetic flux direction.

13. The magnetic assembly according to claim 11, wherein a winding direction of the winding on the first middle pillar is opposite to a winding direction of the winding on the second middle pillar.

14. The magnetic assembly according to claim 11, wherein on the first inner layer, the winding is wound from the incoming terminal for one turn around the first middle pillar in a first direction, wound for N turns around the second middle pillar in a second direction, and electrically coupled to the second inner layer via a first through hole in sequence;

on the second inner layer, the winding is unceasingly wound for N turns around the second middle pillar in the second direction, wound for N turns around the first middle pillar in the first direction, and led out via a second through hole;

the first direction is opposite to the second direction.

15. The magnetic assembly according to claim 14, wherein the printed circuit board further comprises a third inner layer and a fourth inner layer, and N≥2;

on the second inner layer, the winding is electrically coupled to the third inner layer via the second through hole;

on the third inner layer, the winding is unceasingly wound for N turns around the first middle pillar in the first direction, wound for N turns around the second middle pillar in the second direction, and electrically coupled to the fourth inner layer via a fifth through hole;

on the fourth inner layer, the winding is unceasingly wound for N turns around the second middle pillar in the second direction, wound for N turns around the first middle pillar in the first direction, and electrically coupled to the first inner layer via a sixth through hole, and on the first inner layer, the winding is wound for (N−1) turns around the first middle pillar in the first direction and forms the outgoing terminal of the winding.

16. The magnetic assembly according to claim 11, wherein the winding is electrically coupled to the first inner layer via the second through hole, and on the first inner layer, the winding is unceasingly wound for (N−1) turns around the first middle pillar in the first direction and forms the outgoing terminal of the winding.

* * * * *